United States Patent
Juvonen et al.

(10) Patent No.: US 8,400,644 B2
(45) Date of Patent: Mar. 19, 2013

(54) MEANS AND METHOD FOR MEASURING AN ELEVATOR HOISTWAY

(75) Inventors: Harri Juvonen, Lahti (FI); Risto Laine, Lahti (FI)

(73) Assignee: Kone Corporation, Helsinki (FI)

( * ) Notice: Subject to any disclaimer, the term of this patent is extended or adjusted under 35 U.S.C. 154(b) by 127 days.

(21) Appl. No.: 12/976,585

(22) Filed: Dec. 22, 2010

(65) Prior Publication Data

US 2011/0134439 A1 Jun. 9, 2011

Related U.S. Application Data

(63) Continuation of application No. PCT/FI2010/050265, filed on Apr. 6, 2010.

(30) Foreign Application Priority Data

Apr. 7, 2009 (FI) ...................................... 20090135

(51) Int. Cl.
*G01B 11/14* (2006.01)
(52) U.S. Cl. ........... 356/625; 33/542.1; 356/3; 356/138; 356/154; 187/406; 187/394; 187/408
(58) Field of Classification Search ................... 356/625, 356/3, 138, 154; 33/506.08, 542.1; 187/406, 187/394, 393, 408, 414, 391
See application file for complete search history.

(56) References Cited

U.S. PATENT DOCUMENTS

| 4,509,751 | A | 4/1985 | Tabet |
| 5,931,264 | A * | 8/1999 | Gillingham et al. .......... 187/406 |
| 6,422,352 | B1 | 7/2002 | Petterson et al. |
| 2010/0131237 | A1 * | 5/2010 | Pamatmat .................... 356/4.01 |

FOREIGN PATENT DOCUMENTS

| DE | 19616132 A1 | 10/1997 |
| EP | 0457152 A2 | 11/1991 |
| JP | 53-119542 A | 10/1978 |
| JP | 9-221288 A | 8/1997 |
| JP | 2005-98786 A | 4/2005 |
| JP | 2005-106733 A | 4/2005 |
| JP | 2006-62796 A | 3/2006 |
| JP | 2007-261794 A | 10/2007 |
| WO | WO 93/23323 A1 | 11/1993 |
| WO | WO 98/40303 A1 | 9/1998 |
| WO | WO 2009/073010 A1 | 6/2009 |

OTHER PUBLICATIONS

PCT/ISA/237 dated Jun. 15, 2010 for PCT/FI2010/050265.

* cited by examiner

*Primary Examiner* — Gregory J Toatley
*Assistant Examiner* — Iyabo S Alli
(74) *Attorney, Agent, or Firm* — Birch, Stewart, Kolasch & Birch, LLP

(57) ABSTRACT

A device and a method for measuring an elevator hoistway, includes at least one or more laser aligners and a measuring element. The measuring element is provided with an essentially long handle for extending the measuring element into the laser beams transmitted by the laser aligners.

20 Claims, 4 Drawing Sheets

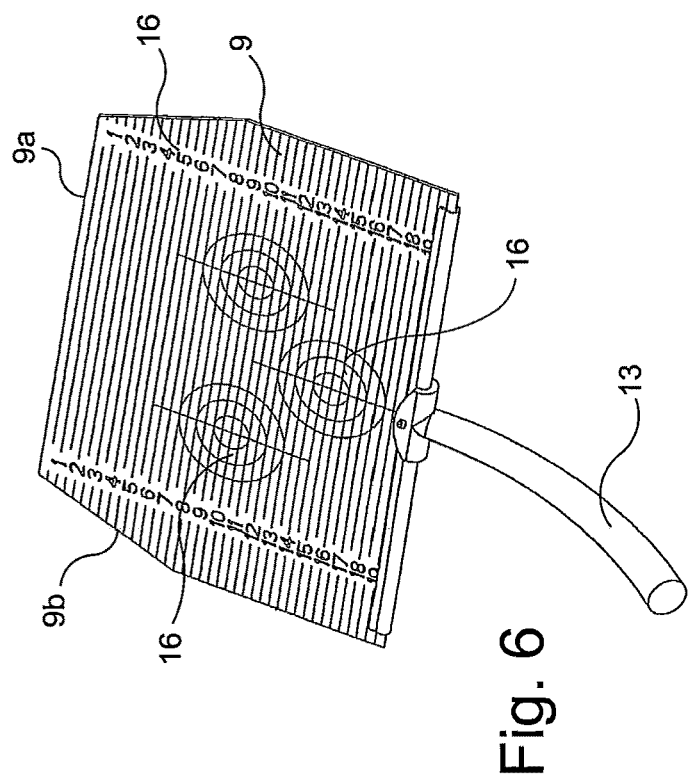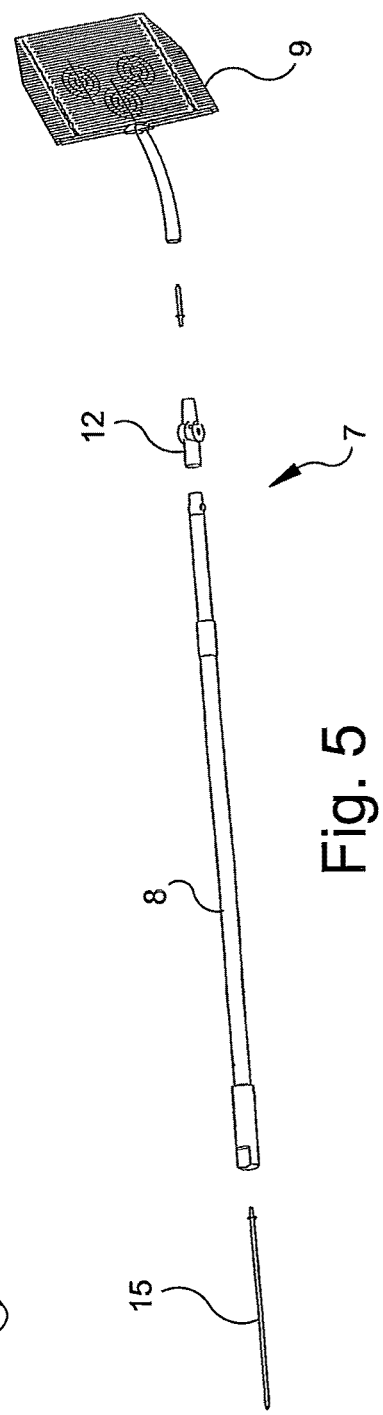

MEANS AND METHOD FOR MEASURING AN ELEVATOR HOISTWAY

CROSS REFERENCE TO RELATED APPLICATIONS

Figure 1:
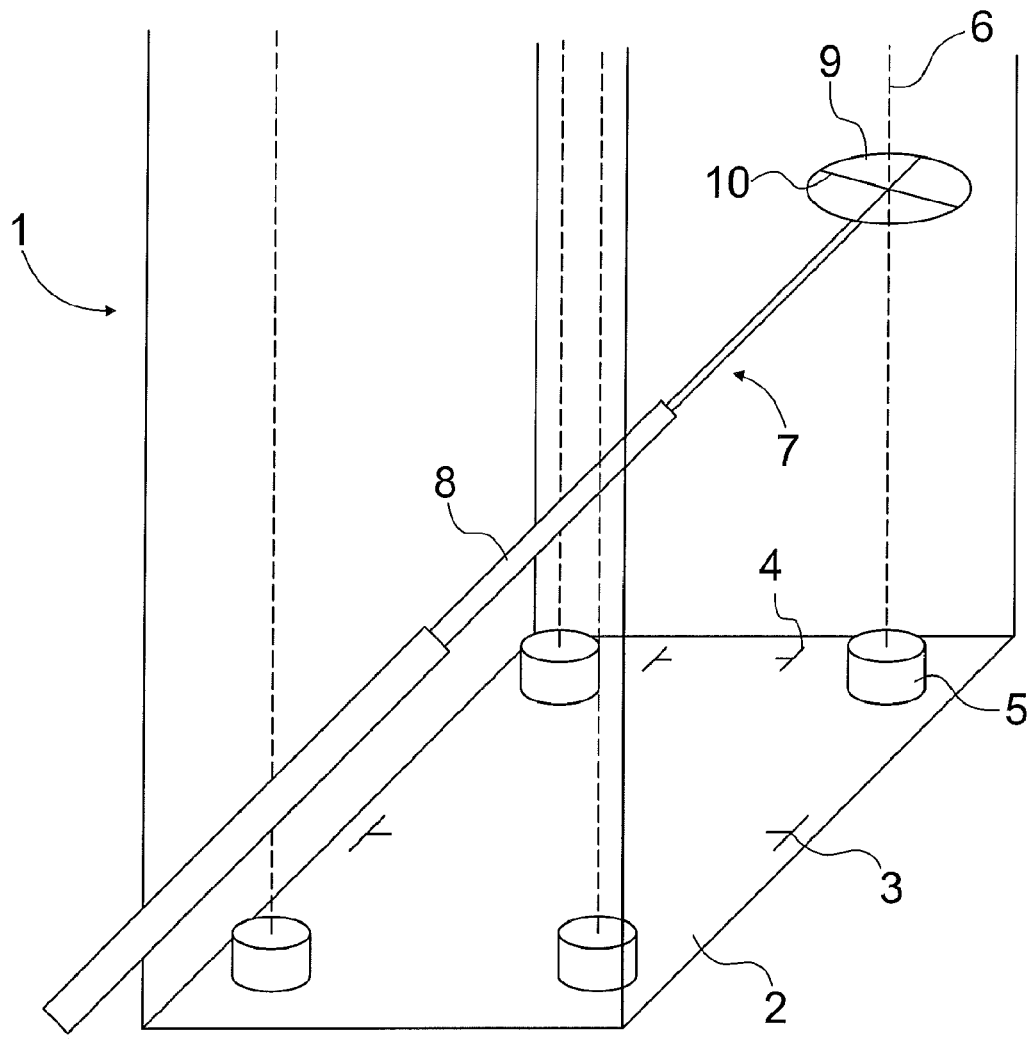

This application is a Continuation of Application No. PCT/FI2010/050265 filed on Apr. 6, 2010, which claims priority under 35 U.S.C. §119(a) to Application No. 20090135 filed in Finland on Apr. 7, 2009. The entire contents of all of the above applications are hereby incorporated by reference into the present application.

The present invention relates to means as defined in the preamble of claim 1 and a method as defined in the preamble of claim 10 for measuring an elevator hoistway.

Before the installation of an elevator into a building, it must be measured whether the elevator hoistway made for the elevator is such in terms of its dimensions that the elevator with all its parts will fit in the correct attitude into the hoistway. This type of measurement can also be performed in connection with the modernization of an elevator, when a new elevator is installed into an existing hoistway. An elevator can be retrofitted into a building that does not have an existing elevator hoistway, e.g. by making an elevator hoistway beside the stairs of the stairway. In this type of case the support structure of the elevator hoistway is made e.g. from steel beams and apertures must be made in the floor landings for the hoistway. Before this type of elevator is installed, it must be measured whether the apertures made in the floor landings are large enough and that no other structures are possibly in the way of the hoistway.

It would be good to perform the measurement for the whole height of the elevator hoistway, because the walls of the hoistway are not necessarily straight or level, and in some points the walls can contain e.g. random local protrusions or bumps. With prior-art means and methods, however, it is not generally possible to measure the whole height of a hoistway. Ordinary tape measures are known to be used in the measurement. The dimensions of the base of a hoistway can be measured rather easily by means of a tape measure, but at the point of the floor landings it is necessary to reach out and even then it may not be possible to reach far enough to measure to the rear edge of the hoistway. With prior-art methods, therefore, it is not possible to measure the whole height of a hoistway. Reaching out while performing a measurement can, moreover, also be dangerous.

The aim of this invention is to eliminate the aforementioned drawbacks and to achieve simple and inexpensive means and also a method for measuring an elevator hoistway, which means and method will enable the measurement of an elevator hoistway safely for the whole height of the hoistway. The means according to the invention are characterized by what is disclosed in the characterization part of claim 1. Correspondingly, the method according to the invention is characterized by what is disclosed in the characterization part of claim 10. Other embodiments of the invention are characterized by what is disclosed in the other claims.

Some inventive embodiments are also discussed in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts. Likewise the different details presented in connection with each embodiment can also be applied in other embodiments. In addition it can be stated that at least some of the subordinate claims can in at least some situations be deemed to be inventive in their own right.

In the invention a vertical laser beam is plumbed to be perpendicular, in other words a horizontal distance from the wall of the elevator hoistway or from some other structure of the building. The plumbing is performed conveniently using a handheld measuring means with a handle, which measuring means comprises a transparent, translucent or opaque plate or corresponding as a sounder. Thus the fitting of an elevator into the elevator hoistway, or the suiting of a retrofitted elevator hoistway to the space reserved or made for it, can easily be demonstrated. Preferably using a template that corresponds in its shape and size to the horizontal space requirement of the elevator or elevator hoistway, as an aid. By means of the template, taking into account the structures of the elevator and/or the elevator hoistway and using the aligning marks preferably marked on the template, the laser aligners are disposed to transmit a laser beam directly upwards. Devices that transmit a vertical thin planar light curtain or laser beam fan can be used instead of an aligner that transmits a laser beam. In this case, of course, the distance of a wall or other structure from this type of light curtain or beam fan is plumbed. In the plumbing an aligner is used which comprises an edge or distance mark to be placed against the wall or structure. When the laser beam illuminates the aligner placed against the wall it can be deduced by means of the distance marking whether the elevator/elevator hoistway has sufficient space in the appropriate direction.

The handle of the measuring means of the invention is preferably telescopic, more preferably telescopic such that the telescopic parts of the handle can be locked to be mutually immovable. Preferably the handle contains a joint, by means of which the handle can be bent into an angle, more preferably the joint of the handle can be locked either to be straight or to be at the angle it is bent to at any given time. The handle can be at the same time both jointed and telescopic.

Although the invention in its important respects aims for easy plumbing of an elevator hoistway, the means relating to the invention can be used more generally than just for plumbing an elevator hoistway or for checking whether an elevator will fit into an elevator hoistway. For example, by means of aligning slots, prober pins or other corresponding parts in the measuring means or to be connected to the measuring means, with which the measuring means correspond to the structures of the elevator or elevator hoistway, the measuring means can be used to transfer a distance of a laser beam targeted on a mark of the measuring element and this type of structure for measuring separately or for comparing to a second corresponding distance. The apparatus of the invention is also suited to transferring or comparing other distances than the distances between a laser beam and an elevator or elevator structures.

One advantage of the solution according to the invention is that by means of it the dimensions of an elevator hoistway can be measured safely, easily, quickly and accurately for the whole height of the hoistway. Another advantage is that the with the method local bumps, etc, in the wall of the hoistway can be found easily. A further advantage is that the solution is simple and inexpensive to implement.

Figure 2:
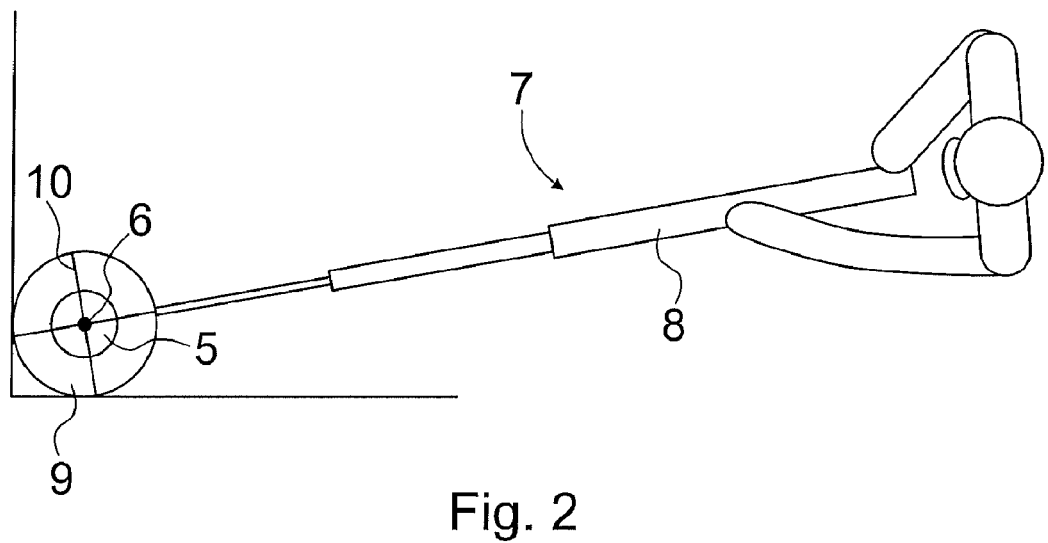
Figure 3:
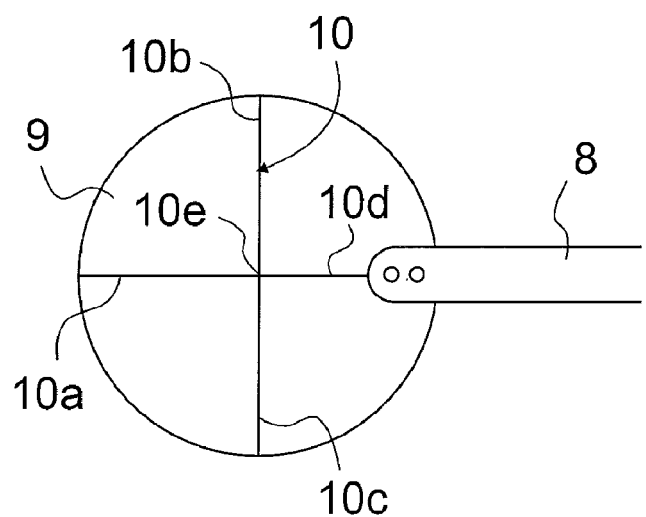
Figure 4:
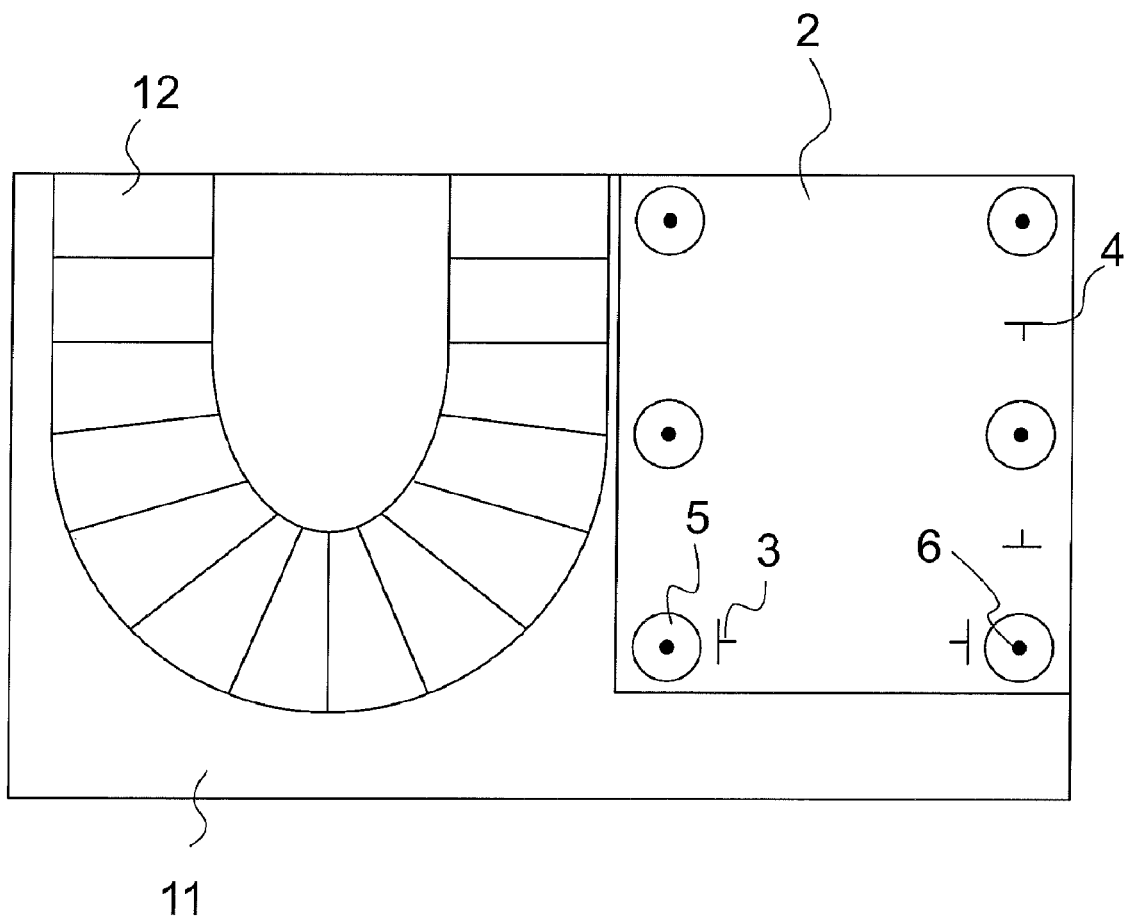

In the following the invention will be described in more detail by the aid of two examples of its embodiments with reference to the attached drawings; wherein FIG. 1 presents a diagrammatic and simplified oblique side view of the bottom part of an elevator hoistway, in which the solution according to the invention is used, FIG. 2 presents a top view of a measuring method according to the invention, FIG. 3 presents a top view of the measuring element of the measuring means according to the invention, FIG. 4 presents a top view of a stairway, in the measurement of which the solution according to the invention is used, FIG. 5 presents a second measuring means applicable to the invention, and FIG. 6 presents a detail of the measuring means according to FIG. 5.

FIG. 1 presents an oblique side view of the bottom part of an elevator hoistway, in which the solution according to the invention is used. A template 2 made of e.g. cardboard or paper is fitted to the base of the elevator hoistway 1, which template is a picture of the lay-out of the elevator and on which the most important points from the viewpoint of measurement, such as e.g. the positions 3 of the guide rails of the car and the positions 4 of the guide rails of the counterweight, are marked. Laser aligners 5 are fitted onto the most important points from the viewpoint of measurement on top of the template in the corners of the elevator hoistway 1, which laser aligners are arranged to transmit a laser beam 6 from each corner directly upwards. The hoistway 1 is measured by means of the laser beams 6 and a handheld measuring means 7. The measuring means 7 comprises a handle 8, which is preferably a telescopic handle, and a measuring element 9 fixed to the end of it, which measuring element is e.g. round in shape and manufactured from a transparent material, such as clear plastic, or from a translucent material, such as from opalescent glass. An essentially right-angled lattice 10, for example, is marked on the measuring element 9, the lines of which lattice travel via the center point of the round shape of the measuring element and thus indicate the center point of the measuring element at their point of intersection.

Measurement of the elevator hoistway 1 is performed by placing the measuring element 9 in an essentially horizontal position such that the laser beam 6 passes through the intersection point of the lattice 10 on it. If the edges of the measuring element 9 make contact with some point on the inner walls of the hoistway 1 such that its center point cannot be fitted in alignment with the laser beam 6, the wall of the hoistway 1 is too close or the hoistway 1 is too small at his point. The hoistway contains at this type of point e.g. an inward pointing protrusion or some other corresponding type of defect. If this occurs, the defect must be removed or, if it is possible, the template 2 must be moved, in other words the intended position of the structures/lay-out of the hoistway must be placed again, after which it is measured again. When the measuring element can be placed in all measurement points such that the laser beam 6 passes at its closest from the walls via the center point of the lattice 10, it is known that there is enough space in the hoistway 1 for the elevator.

FIGS. 2 and 3 present a top view of one measuring means 7 according to the invention. The person performing the measurement performs the measurement with the measuring means 7 by adjusting the telescopic handle 8 to a suitable length and by fitting the measuring element 9 that is at the end of the handle in turn over the laser beams 6 transmitted by all the lasers 5 such that the center point, i.e. the intersection point 10e, of the lattice 10 of the measuring element 9 is at the point of the laser beam 6. If in this case space remains between the walls and the measuring element 9, the hoistway is sufficiently large.

The measurement can also be performed such that the measuring element 9 is pushed in an essentially horizontal attitude to touch the rear wall of the elevator hoistway with its front edge and to touch the side wall of the elevator hoistway with one of its side edges, and also the point of impact of the laser beam 6 is inspected from the measuring element 9, if the impact point is in either direction nearer to the wall of the hoistway than the intersection point 10e of the lattice 10, the wall of the hoistway is too close in this direction and the template 2 must be moved in this direction.

FIG. 3 presents a measuring element 9 of the measuring means 8 in more detail. In the solution according to the embodiment the measuring element 9 is an element that is essentially round in shape, transparent, plate-like, and essentially symmetrical in relation to its center point 10e, in which at least the lines 10b and 10c of the lattice 10 that are transverse with respect to the handle 8 as well as the outer line 10a of the lattice that is aligned with the handle 8 are essentially equally long and terminate at one of their ends in the center point 10e of the measuring element 9. The inner line 10d of the lattice that is aligned with the handle 8 can be shorter than the other lines as long as it terminates at one of its ends at the center point 10e of the measuring element. When measured in this manner, the center point of the measuring element 9 and at the same time of the lattice 10, i.e. the intersection point 10e, is equally as far from at least the front edge and from both side edges of the measuring element 9.

When measuring the suitability of the elevator car to the hoistway the distance of the center point 10e of the measuring element 9 from the front edge and from both side edges of the measuring element 9 is at least as large as or larger than the minimum distance of the elevator car from the inner walls of the hoistway. Correspondingly, when measuring the suitability of the elevator hoistway for e.g. a stairway or for some other suitable place of location, the distance of the center point 10e of the measuring element 9 from the front edge and from both side edges of the measuring element 9 is at least as large as or larger than the minimum distance needed between the outer wall of the elevator hoistway and the structures of the building.

The size of the measuring element 9 can vary according to the minimum distance needed, so that there can be a number of measuring means 9, or measuring elements 9 of different sizes can easily be changed onto a single handle 8 according to need. Likewise, the distance of the intersection point 10e of the lattice 10 of the measuring element 9 from the front edge of the measuring element can be a different magnitude to that from the side edges. In this case the aforementioned distance of the intersection point 10e from the front edge of the measuring element 9 is at least as large as or larger than the minimum distance of the elevator car from the rear wall of the hoistway and the distance of the intersection point 10e from the side edge of the measuring element 9 is at least as large as or larger than the minimum distance of the elevator car from the side wall of the hoistway.

FIG. 4 presents a top view of a stairway, in which the solution according to the invention is used. In the situation of the figure, it is intended to retrofit an elevator hoistway into the stairway 11 and with the measuring method it is measured e.g. whether the aperture to be made in the side of the stairs will be large enough for the elevator hoistway to be retrofitted. With the method also it is possible to measure how large an elevator hoistway will fit into a stairway. A template 2 is placed on the base of the stairway 11 at the point of the planned hoistway, on which template the most important parts of the elevator, such as the positions 3 of the guide rails of the car and the positions 4 of the guide rails of the counterweight, are marked. In addition, six laser aligners 5 are placed on top of the template 2, four in the corners of the template 2 and two on the sides of the template 2. By means of the laser beams 6 transmitted by the laser aligners and the measuring means 7, it is measured whether there is enough space in the stairway throughout its whole height for the elevator hoistway and elevator according to the template 2. The measuring is performed in the same way as is described in the descriptive parts of FIG. 2.

When measuring the suitability of the elevator hoistway to its place of location, and if the laser aligners 5 are placed level with the outer surfaces of the walls of the elevator hoistway to be built, the distance of the center point 10e from the front edge of the measuring element 9 is at least as large as or larger than the minimum distance needed between the outer surface of the rear wall of the elevator hoistway and the structures of the building. Correspondingly, in this case the distance of the center point 10e from the side edge of the measuring element 9 is at least as large as or larger than the minimum distance needed between the outer surface of the side wall of the elevator hoistway and the structures of the building. If the laser aligners 5 are disposed more inwards, the aforementioned distances increase by a corresponding extent.

FIG. 5 presents a second measuring means 7 applicable to the invention. The handle 8 of the measuring means is preferably telescopic and it contains a joint or separate joint part 12, by virtue of which it is possible by bending the handle at the joint or joint part to fit the measuring element 9 into a favorable attitude from the standpoint of working such that the measuring element can easily be brought to meet the laser beam of the laser aligner and/or the measuring element can easily be brought into an attitude in which its markings are facing the measurer. Fitting into a favorable attitude from the standpoint of working is also assisted by the part 13 of the handle that is bent at the vicinity of the measuring element 9. Prober pins 14, 15 of different lengths can be connected to the handle 8, to the joint part 12 or to the bent part 13 of the handle, in which case the distance of a laser beam targeted on a marking of the measuring element to the tip of the prober pin can be transferred to be separately measured or compared. Preferably the prober pin is fixed by means of a joint part to the handle 8 or to the part 13 of the bent handle, but fixing directly to the handle 8, at least at one end of the handle, is also possible. Thus, for example, the correct position of the sill on the hoistway side can be checked. Preferably the prober pin is fixed by means of a joint part to the handle 8 or to the part 13 of the bent handle, but fixing directly to the handle 8, at least at one end of the handle, is also possible. By fixing two prober pins to the handle, the telescopic handle 8 can conveniently be used also for transferring other measurements of the hoistway to be separately measured or for comparison. For example, comparison of the cross-measures of the cross-section of the hoistway can thus be performed easily.

FIG. 6 presents the measuring element 9 of FIG. 5 in more detail. The measuring element is directly fixed to the bent part 13 of the handle, with which part the measuring element connects to the handle or to the prober pin. A plurality of targeting rings 16 are presented by way of example on the measuring element 9, which targeting rings can be one or more, each a defined distance from an edge or corner point of the measuring element. The measuring element 9 also has on view a graduated scale 17 starting from the front edge 9a of the measuring element, in which case it is essentially aligned with the handle 8. The graduated scale can also be made to start from another point of the measuring element, e.g. from the edge 9b so that the graduated scale is aligned transversely with respect to the direction of the handle. The measuring element can also comprise graduated scales that intersect each other.

It is obvious to the person skilled in the art that different embodiments of the invention are not limited to the example described above, but that they may be varied within the scope of the claims presented below.

When applying the invention, the measuring element used can differ from what is described above. For example, the measuring element can be some other shape instead of round, e.g. rectangular or oval. Likewise the measuring element can be of some other material. There can also be an opaque material instead of a transparent material of the measuring element, but in this case the measuring element must be inspected from the same side that the laser beam illuminates.

When applying the invention, the distance of the front edge of the measuring element from the center point of the lattice can also be a different magnitude than the distance of the side edges from the center point, in which case it is convenient to measure the different distances, thus e.g. if the elevator car is such that the minimum distance of the car from the different walls of the hoistway varies. Instead of a lattice, the distance or position can be otherwise marked on the measuring element, e.g. by means of one or more ring patterns or by means of spot markings as the aligning marks.

A separate template is not necessarily needed to indicate the lay-out, but instead the corner points and/or other necessary alignment locations can otherwise be marked on the floor.

The invention claimed is:

1. A device for measuring an elevator hoistway, comprising at least one or more laser aligners and a measuring element, wherein the measuring element is provided with an essentially long handle for extending the measuring element into laser beams transmitted by the laser aligners, and wherein the measuring element comprises an aligning mark, which in connection with the measurement is fitted to be aligned to the laser beams of the laser aligners.

2. The device according to claim 1, wherein the measuring element is a transparent or translucent plate element.

3. The device according to claim 1, wherein the aligning mark is an intersection point of a lattice.

4. The device according to claim 1, wherein when measuring suitability of an elevator car to the hoistway, a distance of the aligning mark of the measuring element from a front edge of the measuring element is at least as large as or larger than a minimum distance of the elevator car from a rear wall of the hoistway and an distance of the aligning mark from a side edge of the measuring element is at least as large as or larger than a minimum distance of the elevator car from a side wall of the hoistway.

5. The device according to claim 1, wherein when measuring suitability of the elevator hoistway to its place of location, a distance of the aligning mark of the measuring element from a front edge of the measuring element is at least as large as or larger than a minimum distance needed between an outer surface of a rear wall of the elevator hoistway and structures of a building, and wherein a distance of the aligning mark from a side edge of the measuring element is at least as large as or larger than a minimum distance needed between an outer surface of a side wall of the elevator hoistway and the structures of the building.

6. The device according to claim 1, wherein the aligning mark of the measuring element is essentially equally as far from both side edges of the measuring element.

7. The device according to claim 1, wherein the aligning mark of the measuring element is essentially equally as far from a front edge and from both side edges of the measuring element.

8. The device according to claim 1, wherein the handle of the measuring element is a telescopic handle adjustable in its length.

9. A device for measuring an elevator hoistway, comprising at least one or more laser aligners and a measuring element, wherein the measuring element is provided with an essentially long handle for extending the measuring element into laser beams transmitted by the laser aligners, and further comprising a template to be disposed on a base of a hoistway space, on top of which the laser aligners are fitted to be disposed.

10. A method for measuring an elevator hoistway by at least one laser sounder and a measuring element, wherein in connection with measuring, the measuring element is extended by a handle to a laser beam transmitted by the laser sounder and, space permitting, aligned with respect to the laser beam such that the laser beam passes via an aligning mark or an intersection point of a lattice, in the measuring element.

11. The method according to claim 10, wherein for the purpose of measuring, a template that essentially corresponds to a lay-out of the hoistway is disposed on a base of a hoistway space, upon the template a plurality of laser aligners are placed near corners of the hoistway to transmit laser beams upwards, and wherein the measuring element that is at the end of the handle is aligned in turn over the laser beams transmitted by all the laser aligners such that the intersection point of the lattice or the aligning mark of the measuring element, is at the point of the laser beam; if in this case space remains between walls of the hoistway and the measuring element, the hoistway is verified to be sufficiently large at the measurement point; if, on the other hand, the intersection point or the aligning mark cannot be made to be fitted to the point of the laser beam, the aforementioned template with the laser aligners is moved until the intersection point or the aligning mark can be made to be aligned over the laser beam.

12. The method according to claim 10, wherein for the purpose of measuring, a template that essentially corresponds to a lay-out of the hoistway is disposed on a base of a hoistway space, the template comprises a plurality of aligning marks, according to which a plurality of laser aligners are placed on the template or on the base of the hoistway to transmit laser beams upwards, and wherein the measuring element that is at the end of the handle is aligned in turn over the laser beams transmitted by all the laser aligners such that the intersection point of the lattice or the aligning mark of the measuring element, is at the point of the laser beam; if in this case space remains between walls of the hoistway and the measuring element, the hoistway is verified to be sufficiently large at the measurement point; if, on the other hand, the intersection point or the aligning mark cannot be made to be fitted to the point of the laser beam, the aforementioned template with the laser aligners is moved until the intersection point or the aligning mark can be made to be aligned over the laser beam.

13. The method according to claim 10, wherein suitability of an elevator car to the elevator hoistway is measured such that the measuring element is pushed to touch a rear wall of the elevator hoistway with its front edge and to touch a side wall of the elevator hoistway with one of its side edges, and also an impact point of the laser beam is inspected from the measuring element, and if the impact point is in either direction nearer to a wall of the hoistway than the intersection point of the lattice or the aligning mark, the wall of the hoistway is too close in this direction and the template must be moved in this direction.

14. The method according to claim 10, wherein the measuring is performed from each floor landing.

15. The method according to claim 10, wherein the measuring is performed from at least one floor landing along at least one laser beam for the whole height of the floor.

16. The device according to claim 2, wherein the aligning mark is an intersection point of a lattice.

17. The device according to claim 2, wherein when measuring suitability of an elevator car to the hoistway, a distance of the aligning mark of the measuring element from a front edge of the measuring element is at least as large as or larger than a minimum distance of the elevator car from a rear wall of the hoistway and an distance of the aligning mark from a side edge of the measuring element is at least as large as or larger than a minimum distance of the elevator car from a side wall of the hoistway.

18. The device according to claim 3, wherein when measuring suitability of an elevator car to the hoistway, a distance of the aligning mark of the measuring element from a front edge of the measuring element is at least as large as or larger than a minimum distance of the elevator car from a rear wall of the hoistway and an distance of the aligning mark from a side edge of the measuring element is at least as large as or larger than a minimum distance of the elevator car from a side wall of the hoistway.

19. The device according to claim 2, wherein when measuring suitability of the elevator hoistway to its place of location, a distance of the aligning mark of the measuring element from a front edge of the measuring element is at least as large as or larger than a minimum distance needed between an outer surface of a rear wall of the elevator hoistway and structures of a building, and wherein a distance of the aligning mark from a side edge of the measuring element is at least as large as or larger than a minimum distance needed between an outer surface of a side wall of the elevator hoistway and the structures of the building.

20. The device according to claim 3, wherein when measuring suitability of the elevator hoistway to its place of location, a distance of the aligning mark of the measuring element from a front edge of the measuring element is at least as large as or larger than a minimum distance needed between an outer surface of a rear wall of the elevator hoistway and structures of a building, and wherein a distance of the aligning mark from a side edge of the measuring element is at least as large as or larger than a minimum distance needed between an outer surface of a side wall of the elevator hoistway and the structures of the building.

* * * * *